United States Patent [19]
Habert et al.

[11] 3,949,920
[45] Apr. 13, 1976

[54] FABRIC ALIGNMENT APPARATUS

[75] Inventors: William C. Habert, Grosse Pointe Farms; Philip A. Phillips, Detroit, both of Mich.

[73] Assignee: Uniroyal Inc., New York, N.Y.

[22] Filed: Aug. 1, 1974

[21] Appl. No.: 494,264

[52] U.S. Cl. .............................. 226/198; 226/199
[51] Int. Cl.[2] .......................................... B65H 23/32
[58] Field of Search ............ 226/195, 198, 199, 33, 226/149, 150; 242/75.2; 271/272

[56] References Cited
UNITED STATES PATENTS

| | | | |
|---|---|---|---|
| 3,174,669 | 3/1965 | Zernov | 226/199 X |
| 3,358,894 | 12/1967 | Hags | 226/198 |
| 3,368,079 | 2/1968 | Lerch | 226/198 X |
| 3,380,686 | 4/1968 | Gaudin | 242/75.2 |
| 3,630,518 | 12/1971 | Street | 271/272 X |
| 3,663,013 | 5/1972 | Wickers | 271/272 X |
| 3,770,178 | 11/1973 | Olah | 226/198 |
| 3,854,315 | 12/1974 | Winkler | 226/198 |

*Primary Examiner*—Richard A. Schacher
*Attorney, Agent, or Firm*—Herbert A. Stern

[57] ABSTRACT

Apparatus for transversely adjusting a longitudinally moving strip of tire breaker building fabric is disclosed. In one embodiment, for adjusting vertically moving fabric, the apparatus comprises a frame including first and second pluralities of cylindrical rollers, the first and second pluralities of rollers being spaced apart to allow the fabric to pass therebetween, first and second transversely spaced rails mounted on the frame for transverse movement, first and second pluralities of cylindrical rollers supported by the respective rails contacting the respective side edges of the strip for transverse movement thereof, a rotatable shaft connected to the first and second rails by first and second link arms for simultaneously and equally moving the first and second rails transversely, and a counterweight connected to the shaft for rotating the shaft in a first direction to urge the rails toward one another and into contact with the side edges of the strip. In a second embodiment, for adjusting horizontally moving fabric, the apparatus comprises a frame including a plurality of universally rotating ball bearings for supporting the strip, first and second transversely spaced rails, first and second pluralities of cylindrical rollers, a rotatable shaft and first and second link arms, the rails, rollers, shaft and arms being similar to those disclosed with respect to the first embodiment, and first and second springs connected between the first and second link arms, respectively, and the frame for rotating the shaft in a first direction to urge the rails toward one another and into contact with the side edges of the strip.

This abstract is not to be taken either as a complete exposition or as a limitation of the present invention, the full nature and extent of the invention being discernible only by reference to and from the entire disclosure.

12 Claims, 7 Drawing Figures

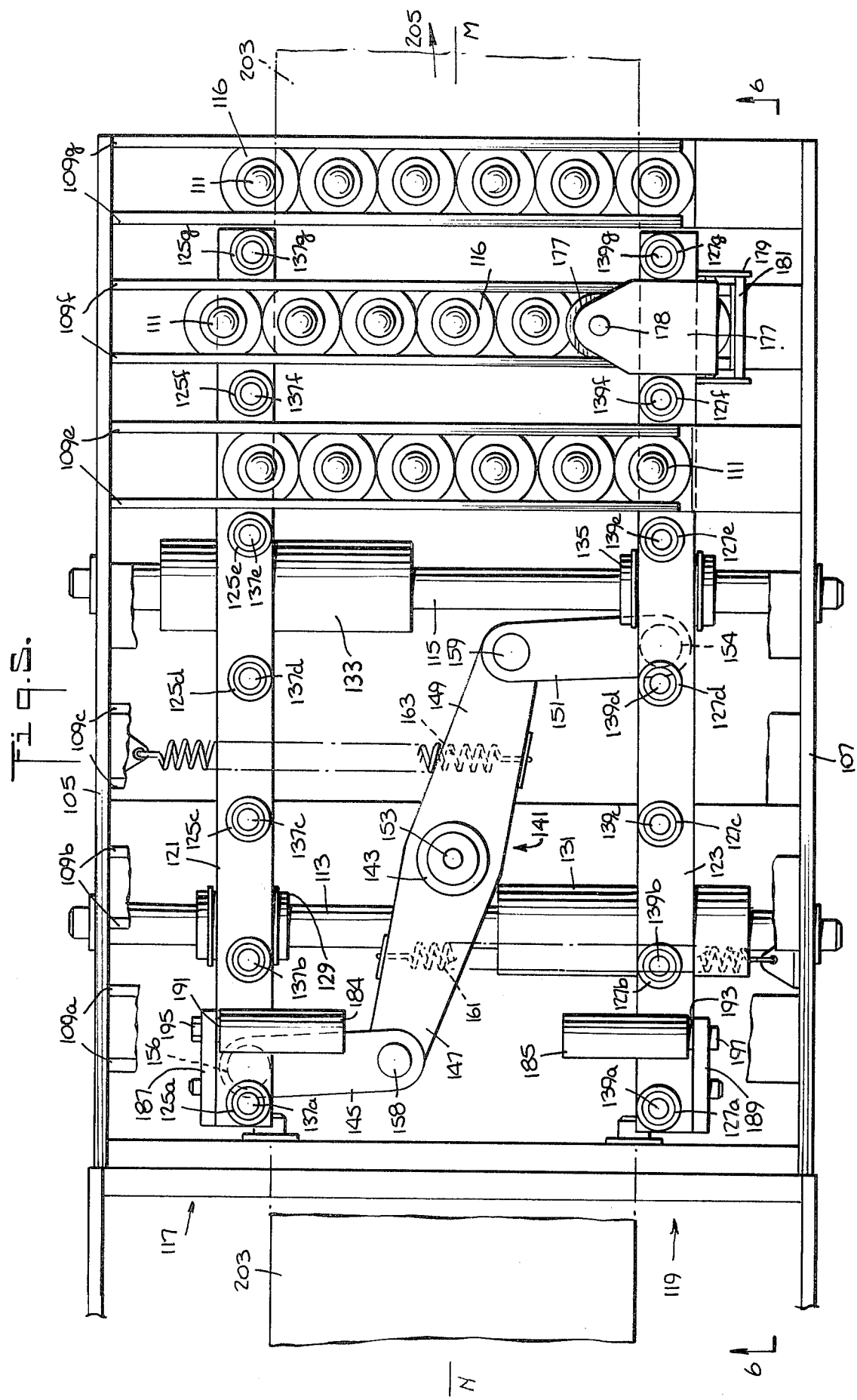

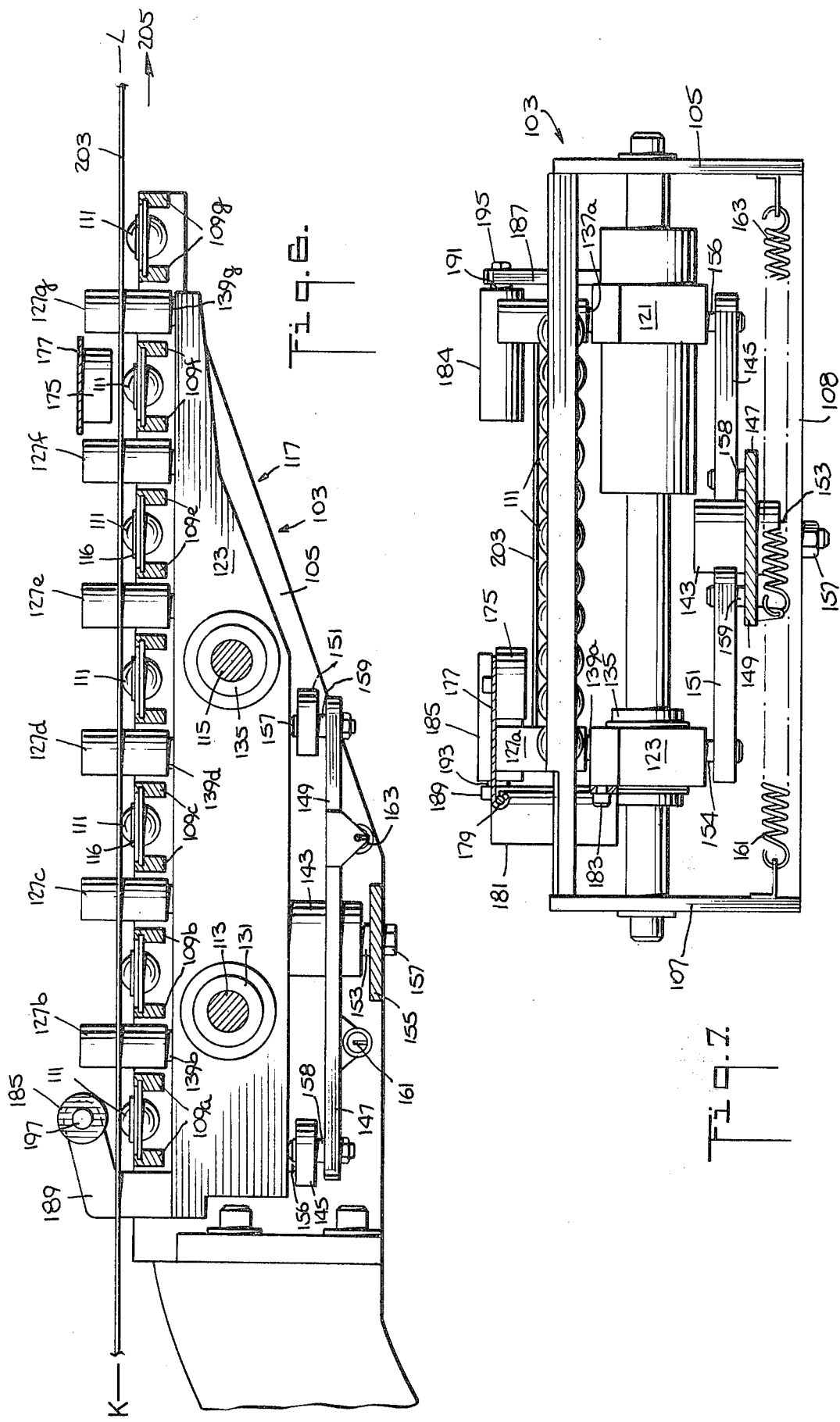

FABRIC ALIGNMENT APPARATUS

BACKGROUND OF THE INVENTION

This invention relates to tire building apparatus and, more particularly, to such apparatus for transversely adjusting a strip of longitudinally moving fabric.

In various tire building operations it is necessary to accurately transversely adjust longitudinally moving strips of flexible, tacky, non-uniform width, fabric relative to a reference plane, such as the median equatorial plane of a tire building drum, or a sector wheel, in order to insure that the completed pneumatic tires incorporating such strips will be of uniform high quality. This accurate transverse adjustment, which is difficult in any event, is made even more difficult if the strip of fabric which is to be adjusted is a breaker strip incorporating generally inextensible cords or cables which form acute angles relative to the longitudinal centerline of the strip, because such cables tend to urge the fabric to move in the direction of the cables.

A number of structures have been proposed for transversely adjusting longitudinally moving strips of fabric. For example, U.S. Pat. No. 3,038,524, discloses a tray, including a plurality of transversely extending cylindrical rollers, the rollers being adapted for limited transverse movement against spring forces, for supporting a strip of tread stock. The tread stock is transversely aligned by passing it through a first pair of rollers which are transversely spaced by a fixed distance and by then passing it through a second pair of pivotable rollers, longitudinally spaced from the first pair of rollers, in contact with the side edges of the tread strip. This device, although it provides for generally satisfactory coarse transverse adjustments of tread strips, is not completely satisfactory for providing precision adjustments. This is due to the fact that the tread strip is flexible and the device provides transverse adjustment at only two discrete points, at the roller pairs, rather than along a longitudinal section of the strip. It is further due to the fact that the tread strip is tacky and transverse movement thereof is thus limited to the transverse movement of the supporting rollers which must overcome opposing spring forces. Furthermore, this device is even less satisfactory for precisely adjusting other tire building fabrics such as breaker strips. This is due to the fact that, as above-noted, longitudinally moving breaker strips tend to follow the path defined by the angled cords of the strips and the limited transverse movement of the support rollers is inadequate for a strip of conventional length.

Another structure which has been proposed for transversely adjusting longitudinally moving strips of fabric is disclosed in U.S. Pat. No. 3,537,936. This structure, which is particularly adapted for use for supporting a breaker strip and a pair of vertically extending, transversely spaced, conveyor belts which are driven at the same speed as the support conveyor. Although this device is generally satisfactory for coarse transverse adjustments of longitudinally moving breaker strips, it too is not completely satisfactory for the precise adjustments necessary for the production of present-day, high quality tires. This is due firstly to the fact that transverse adjustment of the strip, which is tacky, must overcome the frictional forces between the strip and the support conveyor and secondly to the fact that the device pre-supposes that the strip being adjusted is of uniform width which, in practice, is not the case. Thus, this device provides only manual adjustment of the spacing between the vertically extending conveyors so that the device can be used for strips of different uniform widths. It does not, however, provide corrective adjustment for strips of nonuniform width.

SUMMARY OF THE INVENTION

It is, therefore, an important object of the present invention to provide improved apparatus for transversely adjusting a longitudinally moving strip of fabric by means of which the aforesaid drawbacks and disadvantages may be most efficaciously avoided.

It is a further object of this invention to provide improved apparatus for transversely adjusting a longitudinally moving, non-uniform width, strip of tire building fabric relative to a reference plane.

It is yet another object of this invention to provide improved apparatus for transversely adjusting a longitudinally moving, flexible, strip of tire building fabric, along a longitudinal section thereof, relative to a reference plane.

It is a still further object of this invention to provide improved apparatus for transversely adjusting a longitudinally moving strip of tire building fabric in which the effects of friction and inherent directional bias in the fabric are minimized.

Generally speaking, the objectives of the present invention are attained by the provision of apparatus for adjusting a strip of fabric moving longitudinally in a first plane transversely relative to a longitudinally extending reference plane which is orthogonal relative to the first plane comprising a frame, first and second longitudinally extending carriage means supported on the frame for transverse movement, control means coupled to the first and second carriage means for simultaneously and equally moving the carriage means toward and away from each other and the reference plane, and bias means coupled to the control means for continuously urging each of the carriage means into contact with one side edge of the strip for transverse adjustment thereof.

BRIEF DESCRIPTION OF THE DRAWINGS

The foregoing and other objects and features of the present invention will be more clearly understood from the following detailed description thereof when read in conjunction with the accompanying drawings, in which:

FIG. 5 is a partially sectioned top plan view of the embodiment illustrated in FIG. 4;

FIG. 6 is a partially sectioned plan view taken along line 6—6 of FIG. 5; and

FIG. 7 is an end plan view of the apparatus taken in the direction of arrow A of FIG. 4.

DESCRIPTION OF THE PREFERRED EMBODIMENTS

Figure 1:
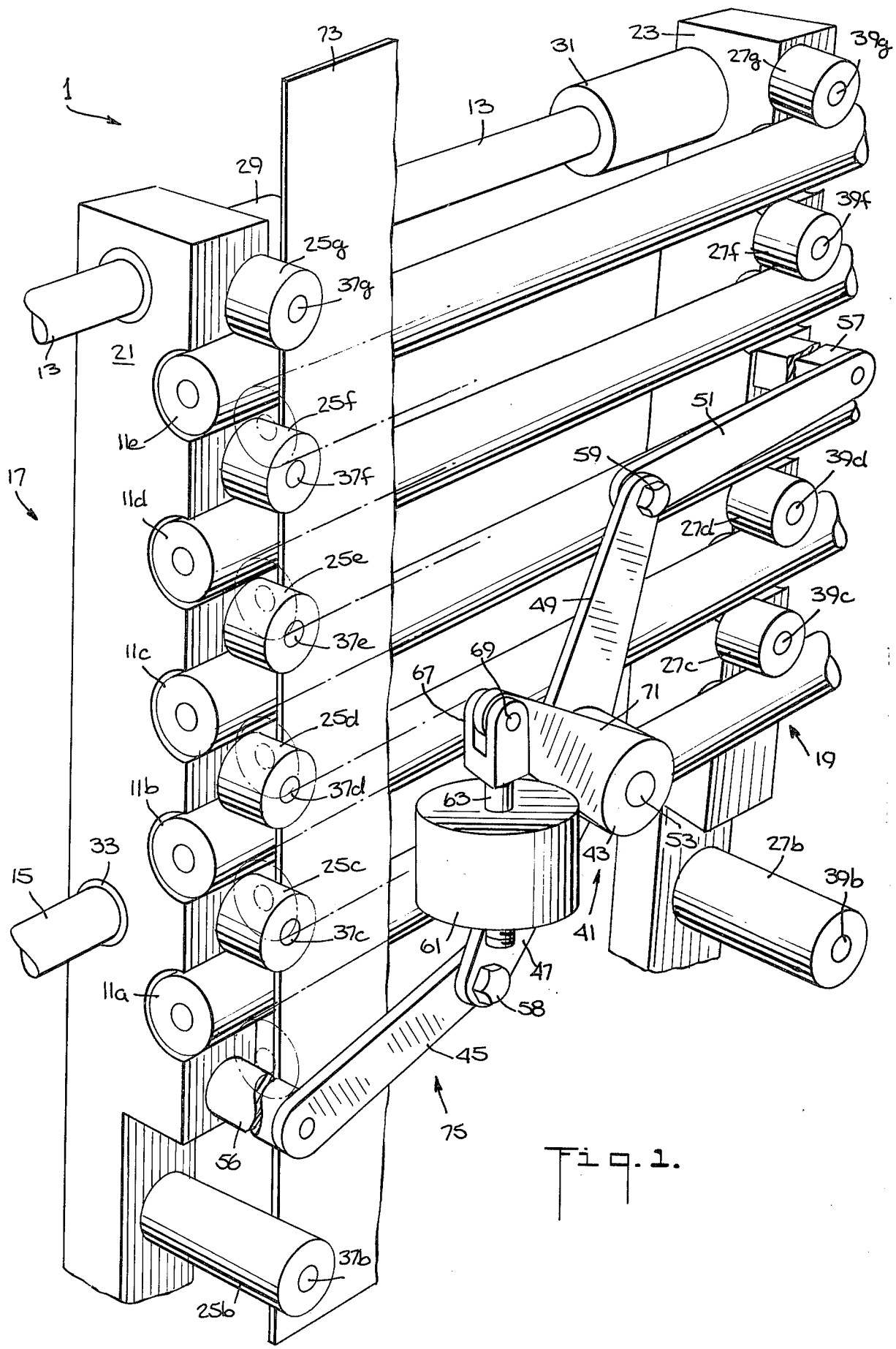
FIG. 1 is a partially sectioned perspective view of one embodiment of the invention.
Figure 2:
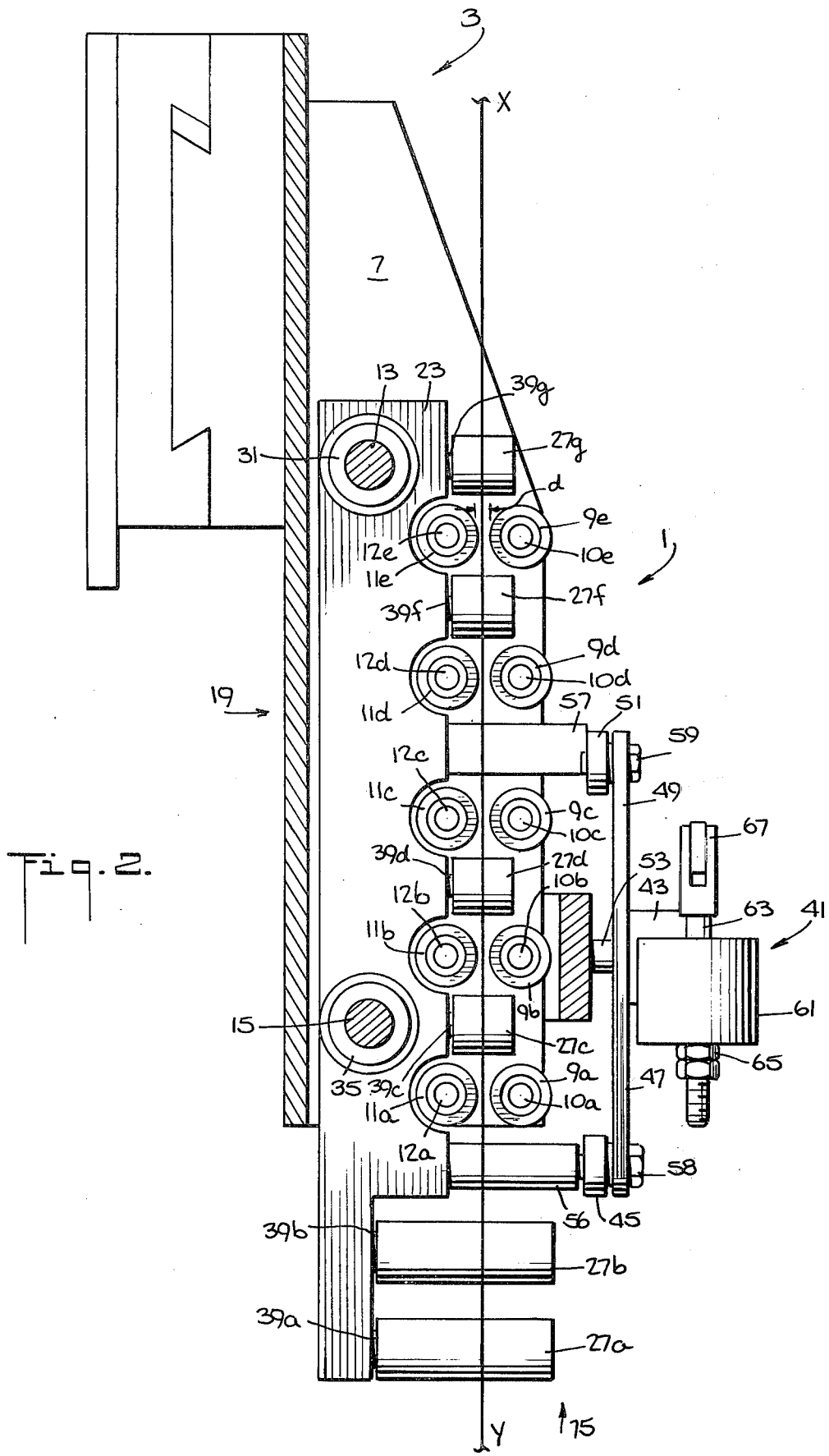
FIG. 2 is a partially sectioned side plan view of the embodiment illustrated in FIG. 1.
Figure 3:
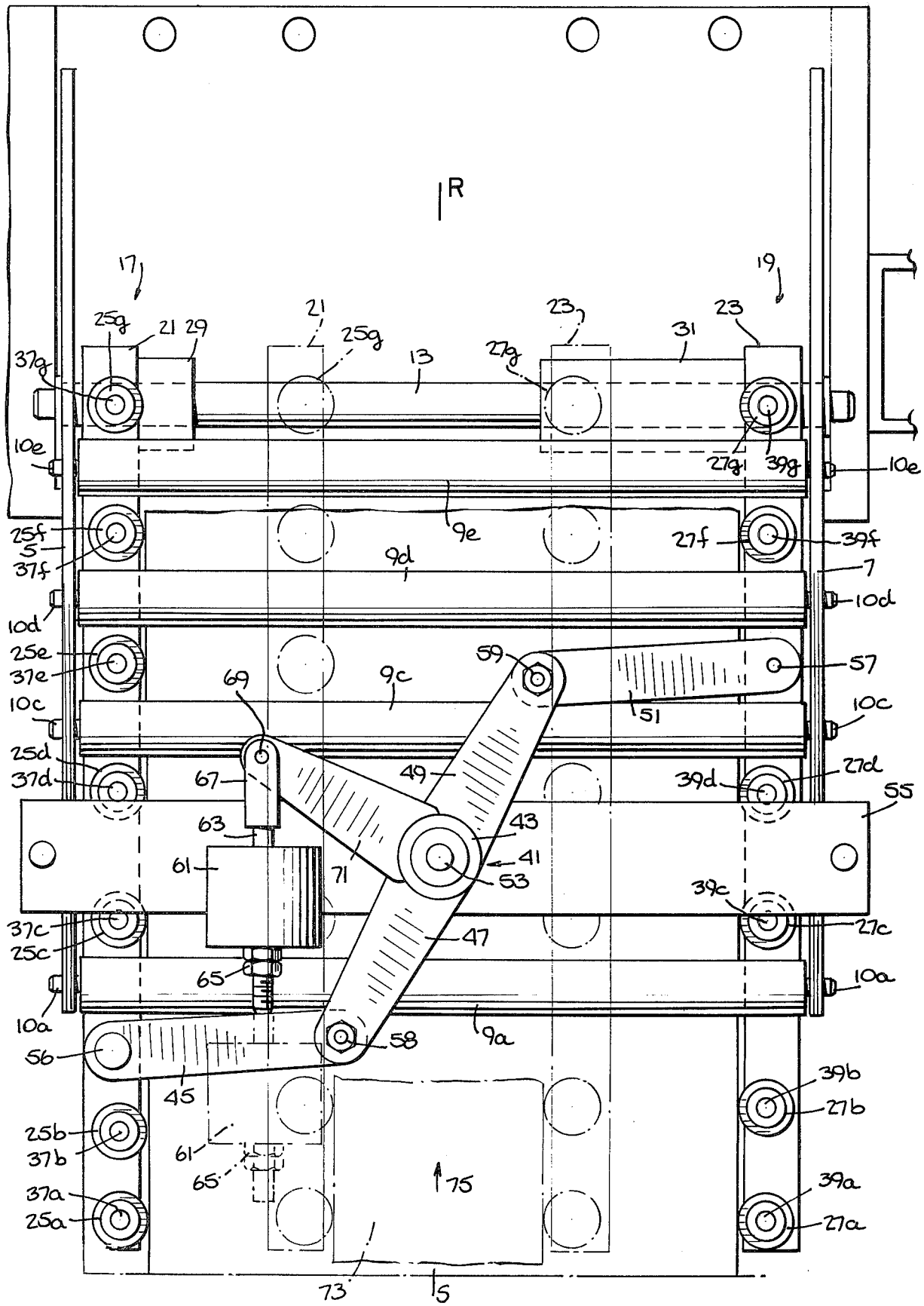
FIG. 3 is a partially sectioned top plan view of the embodiment illustrated in FIG. 1.
Figure 4:
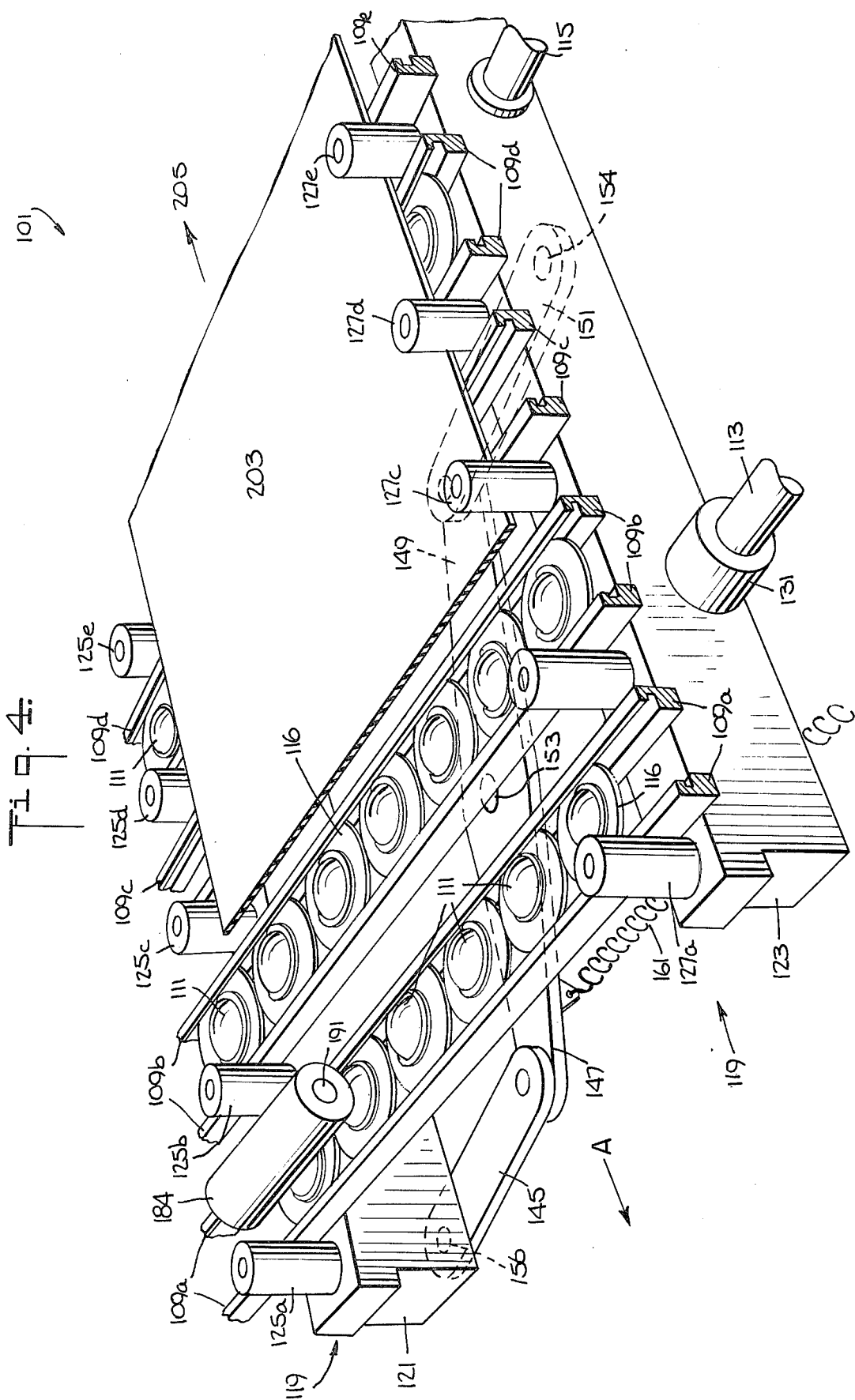
FIG. 4 is a partially sectioned perspective view of a second embodiment of the invention.

Turning now to FIGS. 1 through 3, in which the embodiment of the apparatus adapted for adjustment of longitudinally moving tire building fabric which moves vertically is illustrated, the apparatus is indicated generally at 1. The apparatus 1 includes a fixed frame, indicated generally at 3, which comprises a pair of spaced, parallel, plates 5 and 7, pluralities of cylindrical rollers 9a–9e and 11a–11e, and shafts 13 and 15. The shafts 13 and 15 extend transversely between the plates 5 and 7 and are fixedly connected to the plates by any suitable means. Each of the pluralities of cylindrical rollers, 9a–9e and 11a–11e, extend transversely between the plates 5 and 7 and are rotatably supported by the plates by means of spindles 10a–10e and 12a–12e, respectively, extending from the ends of the rollers, which spindles pass through circular apertures (not shown) formed in the plates 5 and 7, respectively. The rollers 9a–9e all lie in the same plane parallel to a first plane X-Y indicated in FIG. 2 and their axes of rotation extend perpendicularly to a reference plane R-S, indicated in FIG. 3. The rollers 11a–11e also lie in a plane parallel to the first plane X-Y and their axes of rotation also extend perpendicularly to the reference plane R-S. The rollers 9a–9e are spaced from the rollers 11a–11e, in a direction perpendicular to the first plane X-Y, by a fixed distance $d$, indicated in FIG. 2.

The apparatus 1 also includes first and second carriages, indicated generally at 17 and 19, supported by the shafts 13 and 15 for transverse movement therealong. The carriages 17 and 19 include parallel transversely spaced rails 21 and 23, respectively, and pluralities of cylindrical rollers 25a–25g and 27a–27g, respectively. The rails 21 and 23 are slideably coupled to the shaft 13 by ball bushing and sleeve units 29 and 31 and to the shaft 15 by ball bushing and sleeve units 33 and 35. In the embodiment illustrated, and by way of example only, the sleeve portion of ball bushing and sleeve unit 31 is approximately three times as long, in the transverse direction, as is the sleeve portion of ball bushing and sleeve unit 29. For purposes of symmetry, although this is not visible in the drawings, the sleeve portion of ball bushing and sleeve unit 33 is approximately three times as long, in the transverse direction, as is the sleeve unit of ball bushing and sleeve unit 35. The cylindrical rollers 25a–25g each lie in the same plane parallel to the plane R-S and are rotatably connected to the rail 21 by shafts 37a–37g, respectively, and the cylindrical rollers 27a–27g each lie in the same plane parallel to the plane R-S and are rotatably connected to the rail 23 by shafts 39a–39g, respectively. The axis of rotation of each of the cylindrical rollers 25a–25g and 27a–27g is perpendicular to the plane X-Y. The rollers 25a–25g and 27a–27g are offset from the longitudinal centerline of the rails 21 and 23, respectively, so that, for reasons which will be discussed below, a portion of the peripheral surface of each roller is nearer to the reference plane R-S than the inner surface of its respective rail.

The apparatus 1 also includes a control unit, indicated generally at 41, connected between the rails 21 and 23 for simultaneously and equally moving the carriages 17 and 19 toward and away from each other and the plane R-S. The control unit 41 includes a rotatable shaft 43, and arms 45, 47, 49 and 51. The shaft 43 is rotatably connected, by means of a shaft 53, to a transversely extending support beam 55 which is fixedly connected to the frame 3 in any conventional manner. For example, the support beam 55 may be bolted, at the ends thereof, to the plates 5 and 7. The shafts 43 and 53 each extend perpendicularly to the first plane, X-Y, and the axis of rotation of the shaft 43 is thus perpendicular to the plane X-Y. The shafts 43 and 53 are positioned in the reference plane R-S which is coincident with the longitudinal centerline of the frame 3 and the longitudinal centerline of the fabric to be adjusted as will be more fully discussed below. The arms 45 and 51, which are of equal length, are pivotally connected, by means of shafts 56 and 57, respectively, to rails 21 and 23, respectively. The arms 47 and 49, which are of equal length, are each rigidly connected at one end to shaft 43 for rotation therewith. The arms 47 and 49 are pivotally connected at the other ends thereof, by, for example, nut and bolt arrangements 58 and 59, respectively, to arms 45 and 51, respectively. It is thus seen that the shaft 43 is linked to both the carriages 17 and 19.

The apparatus 1 also includes bias means, for example, a counterweight 61, coupled to the shaft 43 for continuously urging the carriages 17 and 19 into contact with the respective side edges of the strip to be transversely adjusted. As shown in FIGS. 1–3, a rod 63 threaded at one end thereof extends through counterweight 61 and is affixed thereto by nuts 65. The rod 63 terminates in a clevis pivot 67 which is pivotally connected, by means of a clevis pin 69, to an arm 71 which is rigidly connected to the shaft 43. It may now be seen that the counterweight 61 provides a torque to the shaft 43 for rotation thereof in a counterclockwise direction as viewed in FIG. 3, thereby urging each of the carriages, 17 and 19, toward the reference plane R-S. It should also be noted that the magnitude of the counterweight is selected so that the torque provided to the shaft 43 is sufficient to rotate the shaft in order to urge the carriages 17 and 19 into contact with the respective side edges of the strip to be adjusted, but insufficient to rotate the shaft to the extent that the transverse stiffness of the fabric is overcome and the carriages are urged inwardly of the side edges of the strip. The purpose of the selection of the magnitude of the counterweight 61 so that the carriages 17 and 19 are continuously urged toward one another but yield nevertheless to the countervailing transverse force provided by the fabric is so that the apparatus may precisely transversely adjust longitudinally moving fabric of non-uniform width. It may thus be seen that the magnitude of the counterweight selected is determined by the transverse stiffness of the fabric to be adjusted.

Turning now to the operation of the instant apparatus, and with reference to FIGS. 1–3, a strip of fabric 73 is shown positioned in the apparatus 1. The fabric 73, for example, a strip of pneumatic tire breaker material comprising a plurality of parallel, rubberized, non-extensible breaker cords, which cords extend obliquely to the longitudinal center-line of the fabric, is drawn through the apparatus 1. For a full description of how the fabric 73 is drawn through the apparatus and for an illustration of a suitable location for the apparatus 1, reference may be had to U.S. Pat. No. 3,654,828. After manual positioning of the fabric 73 in the apparatus and the attachment of the leading edge of the fabric to a suitable driven take-up device, the carriages 17 and 19, which had been held apart to allow positioning of the fabric, are released. The counterweight 61 moves downwardly under the force of gravity and causes the shaft 43 to rotate in a counterclockwise direction. The arms 45 and 47, and 49 and 51, which link the carriages 17 and 19, respectively, to the shaft 43 urge the carriages to move simultaneously and equally toward the reference plane R-S. The rails 21 and 23 and the cylindrical rollers 25a–25g and 27a–27g which comprise the carriages slide transversely on the shafts 13 and 15 until the aforementioned rollers are in contact with the respective side edges of the fabric as shown in dashed lines in FIG. 3. If at this time the longitudinal centerline of the fabric is not coincident with the plane R-S and one side edge of the fabric is therefore not in contact with its corresponding rollers, the rollers on the side to which the fabric is offset move the fabric transversely until the fabric is centered and each side edge of the fabric is in contact with its corresponding rollers. This adjustment is not impeded by frictional forces because, as may be most clearly seen in FIG. 2, the fabric hangs freely in a plane which coincides with the plane X-Y and, as previously noted, the spacing d between the rollers 11a–11e and 9a-9e is selected to be greater than the thickness of the fabric. The absence of frictional resistance is further due to the fact that the fabric is in contact with the rollers 25a–25g and 27a–27g only at the minimally extending zones of tangency therebetween; the fabric need not be drawn past stationary cylindrical surfaces since the rollers 25a–25g and 27a–27g are freely rotatable; and not only will the fabric be only infrequently in contact with any of the rollers 9a–9e and 11a–11e, but these rollers too are freely rotatable. As the fabric 73 is drawn through the apparatus 1, in the direction indicated by arrow 75, the fabric will be maintained precisely adjusted, that is, the longitudinal centerline of the fabric will be coincident with the plane R-S. This precise adjustment is achieved because, as previously noted, the plurality of rollers 25a–25g and the plurality of rollers 27a–27g are always equidistant from the plane R-S and these rollers transversely adjust the fabric 73 until both pluralities of rollers are in contact with the respective side edges of the fabric. This precise transverse adjustment of the fabric 73 is also achieved because, notwithstanding the flexible nature of the strip, the adjustment is concurrently performed along a longitudinal section of the strip, i.e., along the length of the strip extending from rollers 25a–27a to rollers 25a–27g. It will also be seen that this precise transverse adjustment is achieved as well even when the strip of fabric is of non-uniform width. For example, if the strip 73, as it is drawn through the apparatus 1, narrows, the rollers 25a–25g and 27 a–27g will move, equally and simultaneously, toward the plane R-S under the influence of counterweight 61 and the control unit 41, thereby precisely adjusting the fabric. If the width of the strip 73 subsequently increases, then the rollers 25a–25g and 27a–27g will move, equally and simultaneously, apart, because, as previously discussed, the magnitude of the counterweight 61 is selected so that the rotational torque it provides to the shaft 43 may be overcome by the transverse stiffness of the fabric being adjusted. It is thus seen that the rollers 25a–25g and 27a–27g will move together and apart depending on the width of the fabric but that, in either event, the fabric will be transversely shifted until both pluralities of rollers are in contact with the respective side edges of the strip, thereby precisely adjusting the fabric.

Turning now to FIGS. 4 through 7, in which the embodiment of the apparatus adapted for adjustment of longitudinally moving tire building fabric which moves horrizontally is illustrated, the apparatus is indicated generally at 101. The apparatus 101 includes a fixed frame, indicated generally at 103, which comprises a pair of spaced, parallel, plates 105 and 107, a base plate 108 extending between and connected to the plates 105 and 107, pluralities of pairs of parallel slotted guide beams 109a–109g, pluralities of universally rotating ball bearings 111, and shafts 113 and 115. The shafts 113 and 115, which are longitudinally spaced, extend transversely between the plates 105 and 107 and are fixedly connected to the plates by any suitable means, for example, by bolts. Each of the longitudinally spaced pluralities of pairs of slotted guide beams 109a–109g extend transversely between the plates 105 and 107 and are fixedly supported by the plates by any conventional means. For example, the guide beams 109a–109g may be bolted to the plates 105 and 107. The slot formed in each guide beam extends along the transverse length of the beam and the slots of each pair of beams face one another. Each of the universally rotating ball bearings 111 is supported for universal rotation by an apertured retaining disk 116. Each of the plurality of disks 116 is supported and retained by the facing slots formed in one of the pairs of parallel beams 109a–109g. The disk retained bearings are thus arranged in a plurality of longitudinally spaced parallel rows, which rows extend perpendicularly to a reference plane, M-N, indicated in FIG. 5, and the bearings 111 each lie in the same plane parallel to a first plane, K-L, indicated in FIG. 6.

The apparatus 101 also includes first and second carriages, indicated generally at 117 and 119, supported by the shafts 113 and 115 for transverse movement therealong. The carriages 117 and 119 include parallel transversely spaced rails 121 and 123, respectively, and pluralities of cylindrical rollers 125a–125g and 127a–127g, respectively. The rails 121 and 123 are slideably coupled to the shaft 113 by ball bushing and sleeve units 129 and 131 and to the shaft 115 by ball bushing and sleeve units 133 and 135. In the embodiment illustrated, and by way of example only, the sleeve portion of ball bushing and sleeve unit 131 is substantially longer, in the transverse direction, than is the sleeve portion of ball bushing and sleeve unit 129. For purposes of symmetry, the sleeve portion of ball bushing and sleeve unit 133 is substantially longer, in the transverse direction, than is the sleeve unit of ball bushing and sleeve unit 135. The cylindrical rollers 125a–125g each lie in the same plane parallel to the plane M-N and are rotatably connected to the rail 121 by shafts 137a– 137g, respectively, and the cylindrical rollers 127a–127g each lie in the same plane parallel to the plane M-N and are rotatably connected to the rail 123 by shafts 139a–139g, respectively. The axis of rotation of each of the cylindrical rollers 125a–125g and 127a-127g is perpendicular to the plane K-L.

The apparatus 101 also includes a control unit, indicated generally at 141, connected between the rails 121 and 123 for simultaneously and equally moving the carriages 117 and 119 toward and away from each other and the plane M-N. The control unit 141 includes a rotatable shaft 143, and arms 145, 147, 149 and 151. The shaft 143 is rotatably connected, by means of a shaft 153, to a support plate 155 which is fixedly connected to the base plate 108 in any in conventional manner. For example, the support plate 155 may be connected to the base plate 108 by a bolt 157. The shafts 143 and 153 each extend perpendicularly to the first plane, K-L, and the axis of rotation of the shaft 143 is thus perpendicular to the plane K-L. The shafts 143 and 153 are positioned in the reference plane M-N which is coincident with the longitudinal centerline of the frame 103 and the longitudinal centerline of the fabric to be adjusted as will be more fully discussed below. The arms 145 and 151, which are of equal length, are pivotally connected, by means off shafts 156 and 154, respectively, to rails 121 and 123, respectively. The arms 147 and 149, which are of equal length, are each rigidly connected at one end to shaft 143 for rotation therewith. The arms 147 and 149 could of course be formed integrally with the shaft 143. The arms 147 and 149 are pivotally connected at the other ends thereof, by, for example, nut and bolt arrangements 158 and 159, respectively, to arms 145 and 151, respectively. It is thus seen that the shaft 143 is linked to both the carriages 117 and 119.

The apparatus 101 also includes bias means, for example, a pair of helical tension springs 161 and 163 having equal spring constants. The spring 161 is connected between the arm 147 and the plate 107 and the spring 163 is connected between the arm 149 and the plate 105 for continuously urging the carriages 117 and 119 into contact with the respective side edges of the strip to be transversely adjusted. The use of tension springs is by way of example only and clearly, compression springs are also suitable for use if the connections between the arms and the plates is altered properly. It will be seen that the springs 161 and 163 provide a torque to the shaft 143 for rotation thereof in a counterclockwise direction as viewed in FIG. 5, thereby urging each of the carriages, 117 and 119, toward the reference plane M-N. It should also be noted that the magnitude of the force provided by the springs 161 and 163 is selected so that the torque provided to the shaft 143 is sufficient to rotate the shaft in order to urge the carriages 117 and 119 into contact with the respective side edges of the strip to be adjusted, but insufficient to rotate the shaft to the extent that the transverse stiffness of the fabric is overcome and the carriages are urged inwardly of the side edges of the strip. The purpose of the selection of the magnitude of the force provided by the springs 161 and 163 so that the carriages 117 and 119 are continuously urged toward one another but yield nevertheless to the countervailing transverse force provided by the fabric is so that the apparatus may precisely transversely adjust longitudinally moving fabric of non-uniform width. It may thus be seen that the selection of the springs utilized is determined by the transverse stiffness of the fabric to be adjusted.

The apparatus 101 also includes fabric arresting means, here illustrated as a permanent magnet 175, movable into and out of proximity to the fabric to be adjusted for preventing unwanted longitudinal movement of the strip. The magnet 175, most clearly seen in FIGS. 6 and 7, is fixedly connected to a bracket 177 by, for example, a bolt 178. The bracket 177 is pivotally connected, by a pivot 179, to a bracket 181 which is fixedly attached to the rail 123 by, for example, a bolt 183. The magnet 175 is provided for use when strips of fabric containing magnetically attractable material, for example, steel cord containing breaker strips, are to be adjusted. As is known in the art, such breaker strips must be cut to proper length at the output end of the apparatus 101. Since the bulk of the breaker material, in continuous strip form, is likely to be on a reel and/or in a festoon configuration at the input end of the apparatus 101, and since the roller bearings 111 offer virtually no resistance to movement of the fabric, the fabric, when freed at the output end of the apparatus by the aforementioned cutting operation, may tend to slide backward toward the input end of the apparatus. This movement of the fabric toward the input end of the apparatus 101 may also occur, after the cutting operation, if the apparatus, rather then being perfectly horizontal, is utilized in a somewhat inclined configuration, with the output end being higher than the input end thereof, or, if the apparatus 101 is made pivotable about its input end so that the output end is vertically movable. This last noted configuration may be utilized if it is desired, for example, to move the output end of the apparatus into and out of proximity with a following apparatus (not shown), such as a breaker building drum, so that some other apparatus, such as a breaker transfer ring, may be moved into position between the apparatus 101 and such breaker building drum. The undesired longitudinal movement of the fabric is prevented in such event by manually pivoting the magnet 175 into proximity to the strip of breaker material immediately prior to the aforementioned cutting operation, and free longitudinal movement of the fabric is permitted by pivoting the magnet 175 out of proximity with the breaker strip when such movement of the fabric is subsequently desired. Although a single, pivotable, permanent magnet has been illustrated, clearly, two such magnets, one connected to the rail 123 and the other connected to the rail 121, could be provided. Further, electro-magnets could be substituted for the permanent magnets, thereby obviating the necessity of making the magnets pivotable into and out of proximity to the fabric since electronically switching the electro-magnets would serve the same function.

The apparatus 101 also includes ride-up prevention means, here illustrated as a pair of transversely extending cylindrical rollers, 184 and 185, for preventing the fabric to be adjusted from riding-up or crawling over the carriages in contact with the side edges of the fabric. The cylindrical rollers, 184 and 185, are rotatably connected to brackets 187 and 189, respectively, by shafts 191 and 193, respectively, and bolts 195 and 197, respectively. The brackets 187 and 189 are fixedly connected, by bolts 199 and 201, respectively, to rails 121 and 123, respectively. The rollers 184 and 185, which have axes of rotation which are perpendicular to the plane M-N, are affixed to the rails 123 and 125, respectively, in the vicinity of the fabric input end of the apparatus 101. The rollers 184 and 185 operate to prevent the fabric, which may be substantially misaligned when it is first inserted into the apparatus, from riding over the rails 121 and 123 and the rollers 125a–125g and 127a–127g by insuring that the side edges of the fabric are maintained in close proximity with the bearings 111, thereby allowing the carriages 117 and 119 to fulfill their function.

Turning now to the operation of the instant apparatus, and with reference to FIGS. 4–7, a strip of fabric 203 is shown positioned in the apparatus 101. The fabric 203, for example, a strip of pneumatic tire breaker material comprising a plurality of parallel, rubberized, non-extensible breaker cords of a magnetically attractable material, for example, steel, which cords extend obliquely to the longitudinal center-line of the fabric, is supported by the universally rotating ball bearings 111 as it is drawn through the apparatus 101. For a full description of how the fabric 203 may be drawn through the apparatus 101 and for an illustration of a suitable location for the apparatus 101, reference may be had to U.S. Pat. No. 3,607,555. After manual positioning of the fabric 203 in the apparatus and the attachment of the leading edge of the fabric to a suitable driven take-up device (not shown), the carriages 117 and 119, which had been held apart to allow positioning of the fabric, are released. The springs 161 and 163 cause the shaft 143 to rotate in a counterclockwise direction. The arms 145 and 147, and 149 and 151, which link the carriages 117 and 119, respectively, to the shaft 143 urge the carriages to move simultaneously and equally toward the reference plane M-N. The rails 121 and 123 and the cylindrical rollers 125a–125g and 127a–127g which comprise the carriages slide transversely on the shafts 113 and 115 until the aforementioned rollers are in contact with the respective side edges of the fabric as shown most clearly in FIG. 5. If at this time the longitudinal center-line of the fabric is not coincident with the plane M-N and one side edge of the fabric is therefore not in contact with its corresponding rollers, the rollers on the side to which the fabric is offset move the fabric transversely until the fabric is centered and each side edge of the fabric is in contact with its corresponding rollers. This adjustment is virtually unimpeded by frictional forces because the bearings 111 which support the fabric offer virtually no resistance to movement of the fabric, whether that movement is longitudinal, transverse or oblique. The virtual absence of frictional resistance is further due to the fact that the fabric is in contact with the rollers 125a–125g and 127a–127g only at the minimally extending zones of tangency therebetween and the fabric need not be drawn past stationary cylindrical surfaces since the rollers 125a–125g and 127a–127g are freely rotatable. As the fabric 203 is drawn through the apparatus 101, in the direction indicated by arrow 205, the fabric will be maintained precisely adjusted, that is, the longitudinal centerline of the fabric will be coincident with the plane M-N. This precise adjustment is achieved because, as previously noted, the plurality of rollers 125a–125g and the plurality of rollers 127a–127g are always equidistant from the plane M-N and these rollers transversely adjust the fabric 203 until both pluralities of rollers are in contact with the respective side edges of the fabric. This precise transverse adjustment of the fabric 203 is also achieved because, notwithstanding the flexible nature of the strip, the adjustment is concurrently performed along a longitudinal section of the strip, i.e., along the length of the strip extending from rollers 125a–127a to rollers 125g–127g. It will also be seen that this precise transverse adjustment is achieved as well even when the strip of fabric is of non-uniform width. For example, if the strip 203, as it is drawn through the apparatus 101, narrows, the rollers 125a–125g and 127a–127g will move, equally and simultaneously, toward the plane M-N under the influence of the springs 161 and 163 and the control unit 141, thereby precisely adjusting the fabric. If the width of the strip 203 subsequently increases, then the rollers 125a–125g and 127a–127g will move, equally and simultaneously, apart, because, as previously discussed, the magnitude of the force provided by the springs 161 and 163 is selected so that the rotational torque they provide to the shaft 143 may be overcome by the transverse stiffness of the fabric being adjusted. It is thus seen that the rollers 125a–125g and 127a–127g will move together and apart depending on the width of the fabric but that, in either event, the fabric will be transversely shifted until both pluralities of rollers are in contact with the respective side edges of the strip, thereby precisely adjusting the fabric.

Although the foregoing description of the preferred embodiments of the invention has been directed toward the use of the apparatus in either a vertical or a horizontal configuration and for the alignment of the longitudinal center-line of the fabric with a reference plane, it will be understood that the principles of the invention are equally applicable to apparatus which is oriented obliquely with respect to the horizontal or vertical and to apparatus which aligns a longitudinal line of the fabric, other than the center-line thereof, with a reference plane, this last being made possible merely by structuring the appropriate linking arms to be of different, rather than equal, lengths.

It will be understood that the foregoing description of the preferred embodiments of the present invention is for purposes of illustration only, and that the various structural and operational features as herein disclosed are susceptible to a number of modifications and changes, none of which entail any departure from the spirit and scope of the present invention as defined in the hereto appended claims.

What is claimed is:

1. Apparatus for adjusting a strip of fabric moving longitudinally in a first plane transversely relative to a longitudinally extending reference plane which is orthogonal relative to said first plane comprising:
    first and second longitudinally extending carriage means supported on said frame for transverse movement;
    control means coupled to said first and second carriage means for simultaneously and equally moving said carriage means toward and away from each other and said reference plane wherein said control means comprises:
    a rotatable shaft, the axis of rotation thereof being perpendicular to said first plane; and
    first and second linking means connected between said shaft and said first and second carriage means, respectively; and
    bias means coupled to said control means for continuously urging each of said carriage means into contact with one side edge of said strip for transverse adjustment thereof.

2. Apparatus as described in claim 1 wherein said first and second linking means each comprise:
    a first arm pivotally connected at a first end thereof to one of said carriage means; and
    a second arm rigidly connected at one end thereof to said shaft for rotation therewith and pivotally connected at the other end thereof to the second end of said first arm.

3. Apparatus as described in claim 2 wherein the first arms of said first and second linking means are each of equal length and the second arms of said first and second linking means are each of equal length.

4. Apparatus as described in claim 1 wherein said bias means provides torque to said shaft for rotation thereof in a first direction, thereby urging each of said carriage means inwardly towards said reference plane.

5. Apparatus as described in claim 4 wherein said bias means is a counterweight, the torque provided to said shaft being sufficient to rotate said shaft in said first direction to urge said first and second carriage means inwardly into contact with the respective side edges of said strip, said torque being insufficient to rotate said shaft in said first direction to urge said first and second carriage means inwardly of the edges of said strip.

6. Apparatus as described in claim 4 wherein said bias means comprises resilient means, the torque provided to said shaft being sufficient to rotate said shaft in said first direction to urge said first and second carriage means inwardly into contact with the respective side edges of said strip, said torque being insufficient to rotate said shaft in said first direction to urge said first and second carriage means inwardly of the edges of said strip.

7. Apparatus as described in claim 6 wherein said resilient means comprises at least one spring connected between one of said first and second linking means and said frame.

8. Apparatus for adjusting a strip of fabric moving longitudinally in a first plane transversely relative to a longitudinally extending reference plane which is orthogonal relative to said first plane comprising:
   a frame,
   said frame comprising:
   a first plurality of rotating bearings located parallel to said first plane; and
   a second plurality of rotating bearings located parallel to said first plane,
   said first and second pluralities of rotating bearings being fixedly spaced from one another in a direction perpendicular to said first plane by a distance greater than the thickness of said strip of fabric;
   first and second longitudinally extending carriage means supported on said frame for transverse movement;
   control means coupled to said first and second carriage means for simultaneously and equally moving said carriage means toward and away from each other and said reference plane; and
   bias means coupled to said control means for continuously urging each of said carriage means into contact with one side edge of said strip for transverse adjustment thereof.

9. Apparatus as described in claim 8 wherein each of said rotating bearings is a cylindrical roller, the axis of rotation of which is perpendicular to said reference plane.

10. Apparatus as described in claim 8 wherein the direction of longitudinal movement of said strip is generally vertical.

11. Apparatus for adjusting a strip of fabric moving longitudinally in a first plane transversely relative to a longitudinally extending reference plane which is orthogonal relative to said first plane comprising:
   a frame;
   first and second longitudinally extending carriage means supported on said frame for transverse movement;
   control means coupled to said first and second carriage means for simultaneously and equally moving said carriage means toward and away from each other and said reference plane;
   bias means coupled to said control means for continuously urging each of said carriage means into contact with one side edge of said strip for transverse adjustment thereof; and
   at least one transversely extending ride-up roller connected to one of said carriage means and positioned in the vicinity of the fabric entering end of said carriage means for preventing a side edge of said strip from riding up the carriage means in contact therewith.

12. Apparatus as described in claim 11 wherein said ride-up roller is cylindrical and its axis of rotation extends perpendicularly to said reference plane,
   said cylindrical roller being orthogonally positioned relative to said first plane so as to insure that said side edge of said strip is generally maintained in said first plane.

* * * * *

UNITED STATES PATENT AND TRADEMARK OFFICE
CERTIFICATE OF CORRECTION

PATENT NO. : 3,949,920
DATED : April 13, 1976
INVENTOR(S) : WILLIAM C. HABERT et al.

It is certified that error appears in the above-identified patent and that said Letters Patent are hereby corrected as shown below:

Column 1, line 55 after "use" insert --with breaker strips, includes a driven conveyor belt--.

Claim 1, column 10, insert, between lines 28 and 29, --a frame;--.

Signed and Sealed this

Twentieth Day of July 1976

[SEAL]

Attest:

RUTH C. MASON
Attesting Officer

C. MARSHALL DANN
Commissioner of Patents and Trademarks